United States Patent Office 3,591,522
Patented July 6, 1971

3,591,522
REACTIVATION OF GROUP VIII SELECTIVE
HYDROGENATION CATALYSTS
Jean Cosyns, 6 Rue de Sannois, Nanterre, Hauts-de-Seine, France, and Jean-François Le Page, 6 Rue Henri Dunant, Rueil-Malmaison, Hauts-de-Seine, France
No Drawing. Continuation-in-part of abandoned application Ser. No. 592,976, Nov. 9, 1966. This application June 13, 1969, Ser. No. 833,190
Claims priority, application France, Nov. 17, 1965, 38,843
Int. Cl. B01j 11/02
U.S. Cl. 252—414
12 Claims

ABSTRACT OF THE DISCLOSURE

In the selective hydrogenation of highly unsaturated compounds, such as acetylenes and conjugated olefins, to monoethylenic hydrocarbons, said reaction being conducted at about 0–250° C. in the presence of a Group VIII metal, the catalyst becomes deactivated because of the deposit of polymeric or rubbery-like material, and sometimes it is poisoned by sulfurous impurities. The catalyst is reactivated by washing it with inert liquid hydrocarbon at below 200° C., and in subsequent steps, separating the washed catalyst from the liquid, and then contacting the separated catalyst with hydrogen at 200–500° C.

CROSS REFERENCE TO RELATED APPLICATIONS

This application is a continuation-in-part of application Ser. No. 592,976, filed Nov. 9, 1966, now abandoned.

SPECIFICATION

The present invention relates to an improved process of reactivation for application to catalysts comprising a metal of Group VIII of the Periodic Table of Elements, such as for instance cobalt, platinum, palladium or nickel deposited on supports and which have lost at least a part of their activity due to their use for selective hydrogenation of highly unsaturated compounds. These catalysts may contain also complementary hydrogenating components, more particularly compounds of elements of Group VI such as molybdenum or tungsten oxides or neutralizing compounds such as lime, barytes, sodium or potassium oxide.

By highly unsaturated compounds, it is intended to include acetylenic and conjugated diethylenic hydrocarbons, cyclic or acyclic, which may be converted by selective hydrogenation into monoethylenic hydrocarbons, as well as alkenylaromatic hydrocarbons which may be converted by selective hydrogenation into alkylaromatic hydrocarbons.

These hydrocarbons may be subjected to a selective hydrogenation in the form either of chemically well defined and pure substances or of mixtures thereof or in admixture with other hydrocarbons substantially inert in this type of hydrogenation, more particularly saturated hydrocarbons (cyclic or acyclic) monoethylenic hydrocarbons (cyclic or acyclic), aromatic or alkylaromatic hydrocarbons. This is the case, for example, of cuts obtained from dehydrogenation or pyrolysis processes, especially from cracking or steam-cracking. The highly unsaturated hydrocarbons contain at least 2 carbon atoms in their molecule and sometimes more than 30 carbon atoms, there being no upper limit to this number of carbon atoms. In the most interesting cases, this number lies between 3 and 15.

The selective hydrogenation, using one of the above mentioned catalysts, is conducted at a temperature comprised generally between 0 and 250° C. and preferably between 100° and 190° C.

After a certain period of use, these catalysts lose part of their activity. The reason is not well known, but the inventors' experiments have shown that this deactivation was at least partly due to the deposit of polymeric or rubbery-like materials hereinafter referred to as polymers and, sometimes, to an excessive poisoning of the charge by impurities, especially sulfurous ones. In general, then, the catalysts which are deactivated by this invention contain not only about 2 to 30%, preferably 5 to 20% by weight of a Group VIII metal, but also generally about 0.5 to 5% of sulfur in form of sulfurous compounds and generally about 2 to 20% of polymers, the remaining up to 100% being essentially the support.

These polymeric or rubbery like materials which are in fact oligomers most frequently of oily consistency are quite different from the carbonaceous deposits observed in high temperature catalytic hydrocarbon conversion processes such as cracking, reforming and so on.

These last mentioned carbonaceous deposits are essentially composed of polycondensed aromatic rings, the structure of which being closely related to that of graphite and coke.

Therefore this deactivation is different from that which is observed with catalysts employed at higher temperatures for example, in hydrocracking, hydrofining, reforming cited here-above or even pure saturating hydrogenation processes.

Heretofore regeneration could be conducted in general according to any known technique by burning the carbonaceous materials, gums and/or polymers accumulated on the catalyst during its use in selective hydrogenation reactions. However, for the above defined catalysts, this process is difficult and rarely leads to the restoration of the initial activity and selectivity.

Another method is based on a less severe method since it does not use an oxidizing gas. It can be conducted, for instance, by contacting hydrogen with the catalyst, at a fairly high temperature in order to decompose and remove the polymerized products which contaminate the catalyst while simultaneously reducing oxidized or sulfurized compounds of low catalytic activity into the corresponding metal which exhibits a higher catalytic activity in the selective hydrogenation. In fact, however, it has been observed that even this last method is still insufficient to completely restore the initial activity of the selective hydrogenation catalyst.

The present invention relates to a new sophisticated reactivation process whereby the above-mentioned drawbacks are substantially reduced or even completely suppressed.

According to this process, in a first step, the deactivated catalyst is washed with at least one stable hydrocarbon in the liquid phase at a temperature less than 200° C., for example, between 50 and 150° C.; in a second step, the liquid phase is separated from the catalyst; then, in a third step, the catalyst is treated by hydrogen at a temperature comprised between 200° and 500° C., preferably between 350° and 450° C.

As the stable hydrocarbon, there my be used any saturated or monoethylenic hydrocarbon (cyclic or acyclic) or an aromatic or alkylaromatic hydrocarbon (the cycloalkylaromatic hydrocarbons being included) provided that it is in the liquid state under the treatment conditions. These hydrocarbons will usually contain from 3 to 16 carbon atoms and preferably from 6 to 10.

As specific examples are mentioned: propane, n-butane, isopentane, neopentane, n-heptane, isooctane, n-dodecane, n-hexadecane, cyclohexane, methylcylohexane, decahydronaphthalene, 2-butene, 1-octene, cyclohexene, benzene, toluene, xylene, ethylbenzene, 1-methylnaphthalene. Mixtures of hydrocarbons may be used, for example in the form of an aromatic cut or of a gasoline, which contains neither gums nor unstable compounds such as diolefins, acetylenic or alkenylaromatic compounds. The gasolines obtained by reforming or straignt distillation are specially suitable. The presence of aliphatic or cycloaliphatic mono-olefins is not harmful; however, a stable hydrocarbon which is preponderantly (over 50% by volume) aromatic is especially desirable, and a completely aromatic hydrocarbon is particularly preferred.

The preferred temperature range for the treatment with the stable (inert) hydrocarbons is 50–150° C.

The pressure is chosen sufficient to at least maintain a liquid phase of said inert hydrocarbon. A pressure higher than the vapor pressure of the liquid phase is preferably established, by means of hydrogen or any other inert gas. Usually the absolute total pressure will be in the range of 0.5–200 atmospheres. With a gasoline, for example, the total pressure will be preferably in the range of 5–30 atmospheres.

Preferably the hydrocarbons are circulated through a bed of deactivated catalyst, for example, at an hourly rate of 0.5–200 (more preferably 1–10) volumes of liquid hydrocarbons per volume of catalyst. This step takes usually at least 15 minutes and more frequently 1–24 hours.

A reduction in the weight of the deactivated catalyst is usually observed, due to the dissolution of impurities.

To follow this washing step, the amount of dissolved gums or sulfur compounds present in the hydrocarbons issued from the washing step may be determined, for example according to A.S.T.M. methods No. D381–61T and D873 respectively. This washing treatment is thus preferably continued until no more gums or sulfur compounds may be detected in the washing effluent stream.

After the washing step, the catalyst is separated from the washing liquid by a conventional method such as decantation or filtration.

The subsequent treatment by means of hydrogen at 200–500° C. is preferably carried out under an absolute pressure of 1–200 (prefereably 2–30) kg./cm.$^2$ and at an hourly feed rate of gaseous hydrogen of 5–5000 (preferably 50–500) volumes per volume of catalyst (under normal temperature and pressure conditions). Since the hydrogenation step is carried out after the separation step here-above defined and since the temperature is fairly high during said hydrogenation, the small amount of washing liquid which may have been retained by the catalyst is quickly evaporated. Roughly, it can be said that at least 60% and preferably at least 70% of the total time of this third step corresponds to the hydrogenation with the catalyst being in a dry state, the remaining of the time being used to completely dry the catalyst after the separation step.

If the separation of the second step is not carried out, resulting in hydrogenation in the presence of a liquid phase, substantially poorer results are obtained.

Thus, the second step of separatnig the wash liquid is unexpectedly essential for obtaining all the advantages of the invention.

Hydrogen may be used in a substantially pure state or as a mixture with inert gases, for example, as refinery gas. A content of hydrogen of more than 70% by volume is, however, preferred.

The following examples are given by way of illustration, not limitation.

EXAMPLE 1

This example described the reactivation of a catalyst of nickel on alumina which had been used in the selective hydrogenation of a feed charge containing:

Isoprene _____ About 10% (molar).
Benzene _____ About 90% (molar).
Sulfur _____ 100 parts per million (p.p.m.).

whereof 90 p.p.m. of sulfur from thiophene and 10 p.p.m. of sulfur from mercaptans.

The catalyst exhibited the following initial composition:

| | Percent by wt. |
|---|---|
| $Al_2O_3$ | 86.6 |
| CaO | 1 |
| NiO | 12.4 |

This catalyst was contacted with hydrogen at 400° C. before use in order to reduce the nickel compound to the metallic state.

After use, the deactivated catalyst exhibited a 10% increase of its weight as compared with its initial weight.

Liquid benzene was caused to flow through this deactivated catalyst, under a 28 kg./cm.$^2$ pressure and at 80° C., the hourly flow rate being 2 volumes per volume of catalyst, and the operation being continued until no more polymerizate is present in the liquid effluent, which takes about 3 hours.

The injection of benzene is then stopped; the benzene is filtered from the catalyst; and hydrogen is passed through the catalyst at 400° C. under 5 kg./cm.$^2$, at an hourly flow rate of 200–250 liters per liter of catalyst.

This is continued for 3 hours. All the nickel is thus reduced to the metallic state.

The reactivated catalyst is used to treat the above-described feed charge under following conditions (same as the initial conditions):

Pressure $H_2$: 40 bars
Ratio gaseous $H_2$/liquid feed: 250 liters/liter
T: 100° C.
Hourly liquid feed rate: 2 volumes/volume of catalyst.

The following Table I shows the results obtained with the reactivated catalyst (A), as compared with those obtained with the fresh catalyst (B), the deactivated catalyst (C) after 1000 hours of use, or the deactivated catalyst reactivated by hydrogen only (D) under the conditions described above (without washing with benzene).

TABLE I

| Catalyst: | Percent conversion of isoprene |
|---|---|
| Fresh catalyst (B) | 99 |
| Deactivated catalyst (C) | 89 |
| Reactivated catalyst (A) | 99 |
| Reactivated catalyst (D) | +95 |

+A further treatment by hydrogen does not improve this figure.

EXAMPLE 2

This example relates to the selective hydrogenation of a steam-cracker gasoline to remove therefrom highly unstable products such as conjugated diolefins and alkenyl-aromatic hydrocarbons which are gum-producers.

This gasoline exhibited the following characteristics:

Distillation A.S.T.M.—40–207° C.
Specific weight (g./ml. at 20° C.)—0.765
Sulfur—5 p.p.m. by weight The operating conditions were as follows:

T—130° C.
Pressure $H_2$—28 bars
Ratio $H_2$/liquid charge—250 liters/liter
Hourly liquid feed rate—2 volumes/volume of catalyst.

The following Table II gives the results obtained with the fresh catalyst, the deactivated catalyst (2000 hours of use) and the catalyst reactivated as described for (A) in Example 1, except that to benzene was substituted a depentanized gasoline containing no unstable compounds and no gums and exhibiting the following characteristics.

Composition:
 Aromatic hydrocarbons—69% by volume
 Saturated hydrocarbons—31% by volume
Distillation A.S.T.M.—60–180° C.
Gums present before washing with heptane in mg./100 cm.$^3$—nil

TABLE II

| Analysis | Charge | Product with— | | |
|---|---|---|---|---|
| | | Fresh catalyst | Deactivated catalyst | Reactivated catalyst |
| Bromine number (A.S.T.M.— D. 1159–61) | 66 | 50 | 58 | 49.9 |
| Maleic anhydride value (MAV) (U.O.P. method 326.58) | 74 | 0 | 34 | 0 |
| Gums present (mg./100 cm.$^3$) (A.S.T.M.—D 381–61T) | 25 | 200 | 2,000 | 150 |
| Gums present after washing with heptane (mg./100 cm.$^3$) | 7 | 7 | 8 | 7 |
| Potential gums (mg./100 cm.$^3$) (A.S.T.M.—D.873) | 7,400 | 300 | 3,500 | 150 |
| Octane number clear (research method) (A.S.T.M.—D. 908–58) | 98 | 97 | 98 | 97 |

The analyses were conducted on the crude fraction at the outlet of the reactor, and not after distillation.

EXAMPLE 3

In this example, several reactivation methods are compared. The treated catalysts are of the same kind as that of Example 1 whereas the feed charge has the same composition as that of Example 2.

The first step of the reactivation is carried out with the depentanized gasoline described in Example 2. The treatment by means of gasoline and that carried out with hydrogen are the same as described in Example 2.

The results are given in Table III.

TABLE III

| Reactivation process | Percent conversion of diolefins |
|---|---|
| No reactivation (deactivated catalyst, after 2,000 hours of use) | 54 |
| Same deactivated catalyst treated only by gasoline at 80° C. under 28 bars H$_2$ | 55 |
| Same deactivated catalyst treated first by gasoline at 80° C. under 28 bars H$_2$ and then by hydrogen at 400° C. (for 10 hours) in the presence of the gasoline liquid phase (i.e., without separating the gasoline from the catalyst before hydrogenation) | 96 |
| Same deactivated catalyst treated first by gasoline at 80° C. under 28 bars H$_2$, separated from the gasoline, and then by hydrogen (2 hours at 220° C. to completely dry the catalyst and 8 hours at 400° C.) | 100 |
| No reactivation (deactivated catalyst, after 1,500 hours of use) | 63 |
| Same deactivated catalyst after reactivation by hydrogen at 400° C. (10 hours) | 95 |
| Same deactivated catalyst after reactivation by hydrogen at 400° C. (10 hours) followed by gasoline at 80° C. under 28 bars H$_2$ | 95 |

In Table III, the catalytic activity is measured by the percent conversion of diolefins, expressed as:

$$100 \times \frac{MAV_o - MAV_{ef}}{MAV_o}$$

wherein MAV$_o$ is the maleic anhydride value of the feed charge and MAV$_{ef}$ the maleic anhydride value of the effluent.

The following may be deduced:

(1) The reactivation by mere washing with gasoline is inefficient.

(2) The reactivation by mere hydrogenation is only partial.

(3) The regeneration by washing followed by hydrogenation without separation of the washing liquid after the first step is only partial.

(4) The best results are obtained when all steps are conducted in the definite sequence: (1) washing; (2) separation; (3) hydrogenation.

EXAMPLE 4

A selective hydrogenation is carried out on a gasoline of density ($d_4^{15}$) 0.76, exhibiting a dark color, a bromine number of 72 and a MAV of 73.

The catalyst is palladium.

The hydrogenation is carried out at 50° C. and 30 kg./cm.$^2$ with an hourly liquid feed rate of 4 volumes per volume of catalyst.

The ratio H$_2$/liquid hydrocarbon is 20 liters per liter.

After deactivation, the catalyst is regenerated as described in Example 1, however, the hydrogenation step is carried out at 210° C. (and not 400° C.).

The following results were obtained:

| | Density | Color | Bromine index | MAV |
|---|---|---|---|---|
| Feed charge | 0.760 | Dark | 72 | 73 |
| Product (fresh catalyst) | 0.758 | No color | 55 | 2.5 |
| Product (deactivated catalyst) | 0.759 | do | 65 | 10 |
| Product (regenerated catalyst) | 0.758 | do | 59 | 3.2 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An improved process for reactivating deactivated catalysts containing a Group VIII metal deposited on a support, and minor contaminating amounts of sulfurous compounds and polymers, said catalysts having been previously used for the selective hydrogenation of an unsaturated organic compound selected from the group consisting of acetylenic, conjugated diethylenic and alkenylaromatic hydrocarbons at a temperature between 0 and 250° C., said process comprising, in a first step, washing the deactivated catalyst with at least one stable preponderantly aromatic liquid hydrocarbon, at a temperature lower than 200° C. in the liquid phase for at least 15 minutes; in a second step, separating the washed catalyst from said liquid; and, in a third and subsequent step, contacting the washed catalyst with hydrogen at 200–500° C. wherein the pressure is 1–200 kg./cm.$^2$ and wherein the hydrogen hourly feed rate is 5–5000 volumes per volume of catalyst, said washed catalyst being substantially completely dry during at least about 60% of the total period of time in the third step.

2. A process according to claim 1, wherein the deactivated catalyst is washed with a mixture of stable liquid hydrocarbons.

3. A process according to claim 1, wherein the temperature in the first step is 50–150° C.

4. A process according to claim 1, wherein the washing of the first step is continued at least until no more polymers or sulfur compounds are dissolved in the stable liquid hydrocarbon.

5. A process according to claim 1, wherein the hourly feed rate of stable liquid hydrocarbon is 0.5–200 volumes per volume of catalyst.

6. A process according to claim 1, wherein the temperature in the third step is 350–450° C.

7. A process according to claim 1, wherein the catalyst contains nickel and alumina.

8. A process according to claim 1, wherein the catalyst contains nickel, molybdenum oxide and alumina.

9. A process according to claim 1, wherein the catalyst contains palladium.

10. A process according to claim 1, wherein said at least one stable liquid hydrocarbon consists essentially of aromatic hydrocarbon.

11. A process as defined by claim 1, wherein said washed catalyst is employed in the completely dry state during at least about 60% of the total time of said third step.

12. A process as defined by claim 1, wherein said washed catalyst is employed in the completely dry state during at least about 70% of the total time of said third step.

References Cited
UNITED STATES PATENTS

| | | | |
|---|---|---|---|
| 1,759,814 | 5/1930 | Gray | 208—257X |
| 2,367,474 | 1/1945 | Stewart | 252—414X |
| 3,075,917 | 1/1963 | Kronig et al. | 260—683.9X |
| 3,215,618 | 11/1965 | Watkins | 260—683.9X |
| 3,216,924 | 11/1965 | McKinney et al. | 260—683.9X |
| 3,308,071 | 3/1967 | White et al. | 208—257X |
| 3,375,293 | 3/1968 | Breckoff et al. | 252—414X |

DANIEL E. WYMAN, Primary Examiner

P. E. KONOPKA, Assistant Examiner

U.S. Cl. X.R.

252—411R; 260—677, 683.9